Aug. 7, 1928.
A. OLSON ET AL
1,679,443
AUTOMOBILE AWNING
Filed Oct. 16, 1926
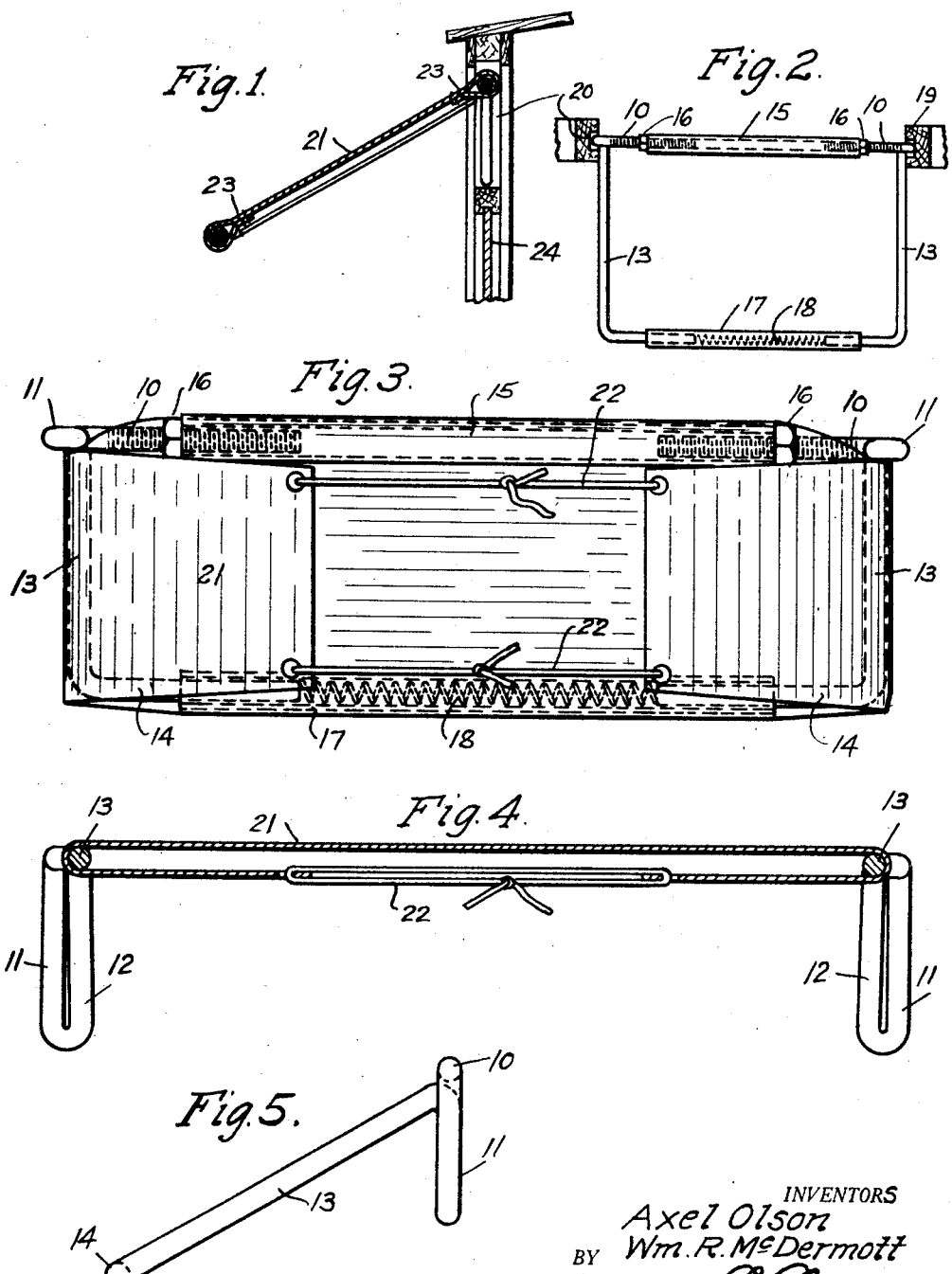
INVENTORS
Axel Olson
Wm. R. McDermott
BY Watson E. Coleman
ATTORNEY.

Patented Aug. 7, 1928.

1,679,443

UNITED STATES PATENT OFFICE.

AXEL OLSON AND WILLIAM R. McDERMOTT, OF DENVER, COLORADO.

AUTOMOBILE AWNING.

Application filed October 16, 1926. Serial No. 142,064.

This invention relates to the awnings of automobiles and the general object of the invention is, of course, to keep the sun from striking the face of the driver either from the front of the automobile or from the side windows thereof.

A further object is to provide an awning which is adjustable to fit any width of window and which will be held securely in place against any tendency to slide up or down.

A still further object is to form the awning supporting frame of two sections or end pieces which are capable of being manually forced away from each other and into the sash grooves of the window frame so as to support the awning in place and to provide in this connection an awning proper which may be taken up or let out so as to accommodate it to the adjustment of the awning supporting frame.

Other objects will appear in the course of the following description.

Our invention is illustrated in the accompanying drawings wherein:—

Figure 1 is a vertical section through the wall of an automobile and the window opening thereof, showing our awning in position;

Fig. 2 is a horizontal section through the window frame showing the awning frame in plan;

Fig. 3 is an underside plan view of the awning frame;

Fig. 4 is a vertical sectional view through the awning and frame;

Fig. 5 is a side elevation of one of the end frames.

The support for the awning proper consists of two end frames or sections, each formed of a single piece of heavy wire or rod bent to form a horizontal portion 10 which is screw-threaded, a vertical portion 11, an upwardly extending vertical portion 12, an outwardly and downwardly extending portion 13, and a horizontal portion 14. The ends of the portions 10 of the end frames are inserted within a sleeve 15 and nuts 16 are engaged with the screw-threads of the portions 10 and bear against the ends of said sleeve. The ends of the horizontal portions 14 of the end frames are inserted within a sleeve 17, within which is disposed a coiled compression spring 18 which bears against the ends of the portions 14 and forces the two sections or end frames apart. These end frames are inserted within the window frame or between the window jambs 19 with the vertical portions 11 and 12 disposed within the sash grooves 20, the nuts 16 being turned so as to force these end frames laterally outward until the end frames have secure engagement with the window jambs to hold the awning supported in place and against displacement. Of course, as the end frames are adjusted outward by means of the nuts 16 bearing against the sleeve 15, the spring 18 will force the outer ends of the awning support laterally away from each other to correspond with the adjustment of the inner portions of the end frames.

The awning 21 is formed of a strip of canvas or other material of like nature, which extends at its ends around the portions 13, these ends then extending towards each other and being held by the laces 22. The forward and rear margins of the canvas may be folded over to form hems 23 to embrace the sleeves 15 and 17. Obviously, if the awning frame is expanded, the laces will be untied and the awning correspondingly expanded, then the awning drawn tight upon the end frames after the latter have been adjusted, and the laces again tied, thus keeping the awning proper taut at all times. It will be seen that the principal advantages of our improved awning are that it may be accommodated to various sized windows and securely held in place therein, that inasmuch as the end frames have vertical portions fitting within the window grooves, the awning cannot tilt downward or upward beyond the angle to which the portions 13 have been bent. Furthermore, it may be engaged in the sash grooves or runs without any special provision, no screws or bolts whatever being required. It will be understood that the window sash designated 24 in the drawings, does not in any way act to support the awning as this is held in position entirely by the outward pressure exerted by the nuts 16. Of course, we do not wish to be limited to the method of lacing the awning in place as this may be varied nor do we wish to be limited to the exact details of construction, the main feature of our invention residing in the means whereby slack is taken up in the awning proper and by which the awning frame is held in place in the sash grooves.

We claim:—

1. An automobile awning including separate, oppositely disposed end frames, each frame having a vertical portion, a screw-threaded horizontal portion extending inward from the vertical portion, a downwardly and outwardly extending awning supporting portion, and a horizontal portion on the end thereof, said horizontal portions extending towards each other, sleeves engaging the first and second named horizontal portions of the end frames, means for manually adjusting the end frames nearer to or further from each other and against the jambs of the window, and an awning proper supported by the awning supporting portions of the end frames and adjustable as to width.

2. An automobile awning including separate, oppositely disposed end supporting frames, each frame being formed of a single length of material bent intermediate its ends to form vertical portions adapted to be disposed within the sash grooves of a window frame, one of said vertical portions having a screw-threaded horizontal portion, the material being extended downward and outward from the other vertical portion to form an awning support and being then extended horizontally, a sleeve within which the last named horizontal portions of the two frames are disposed, a compression spring within said sleeve and bearing against the inserted ends of the end frames, a second sleeve into the ends of which the first named horizontal portions extend, nuts engaging the screw-threads thereof and bearing against the ends of the sleeve, and an awning having hems embracing the sleeves and at its ends extending beneath the awning supporting portions of the frame, the ends of the awning being laced to each other.

3. An automobile awning including oppositely disposed end frames, each having a vertical portion adapted to rest within the sash grooves of a window frame and each having an outwardly extending awning cover supporting portion, means for manually forcing and holding the frames apart and against the window jambs, and an awning cover having free end portions embracing the outwardly projecting portions of the end frames, and means for adjustably connecting the free ends of the cover.

In testimony whereof we hereunto affix our signatures.

AXEL OLSON.
WILLIAM R. McDERMOTT.